Feb. 28, 1967  A. GIACOVAS  3,306,521
SELF-SEALING PAPERBOARD CARTONS
Filed Oct. 28, 1965  5 Sheets-Sheet 1
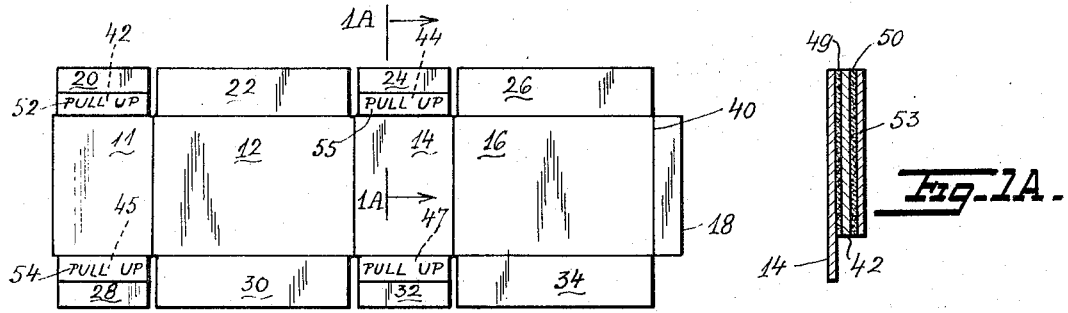
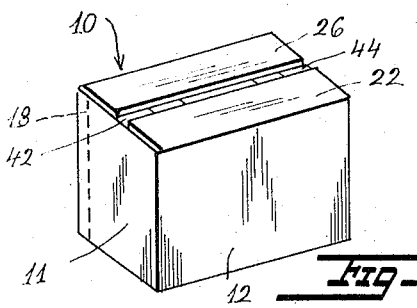
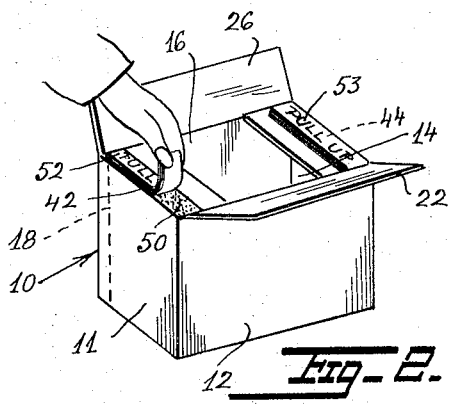
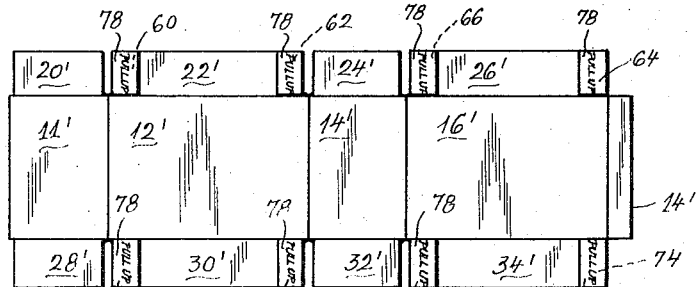
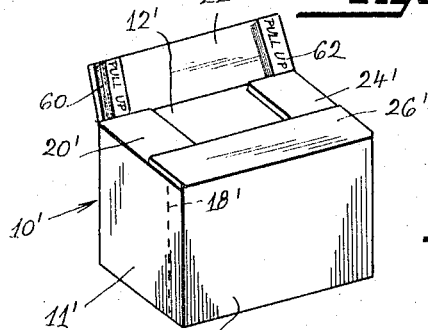
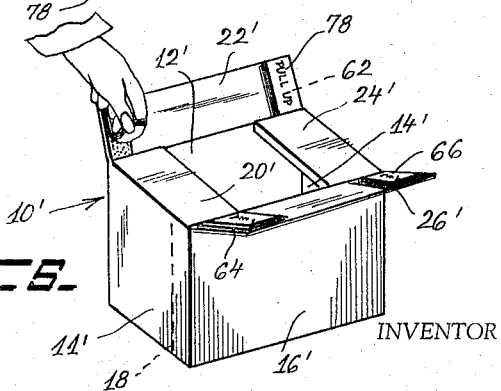
INVENTOR
Alfred Giacovas
BY Placheck & Saulsbury
ATTORNEYS

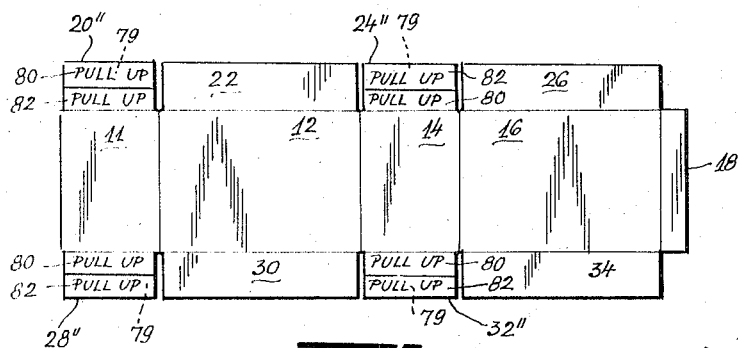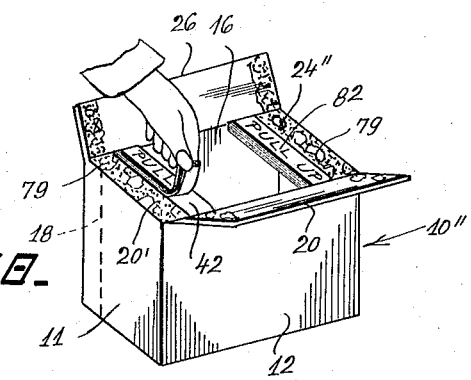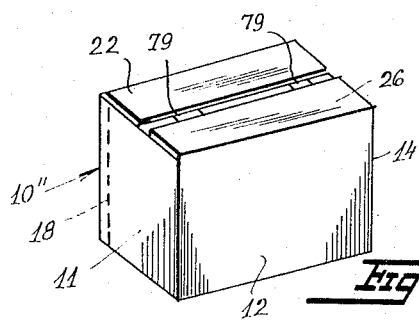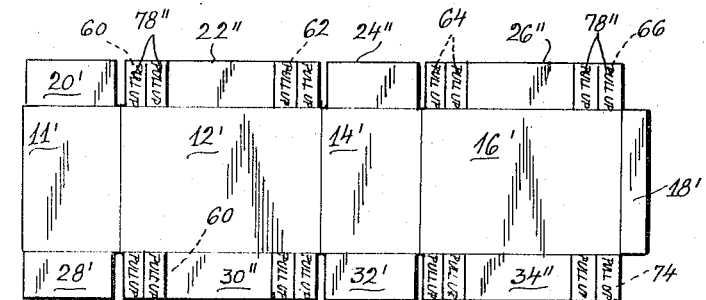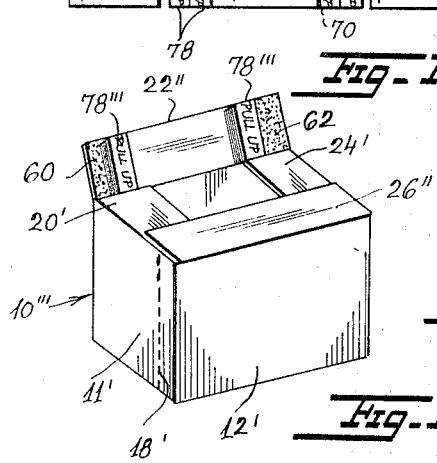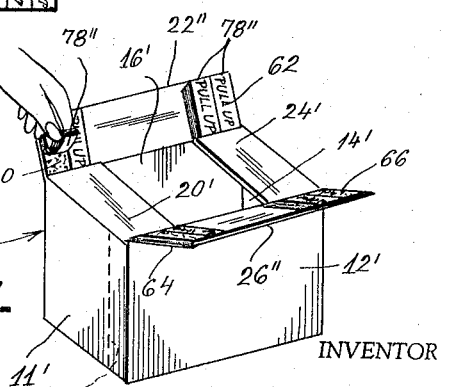

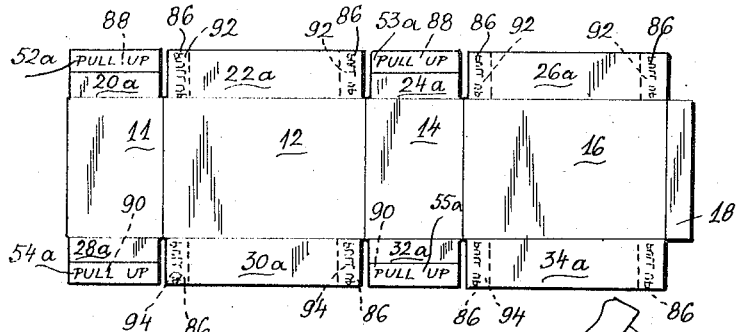
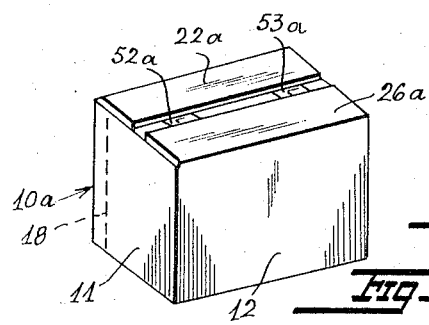
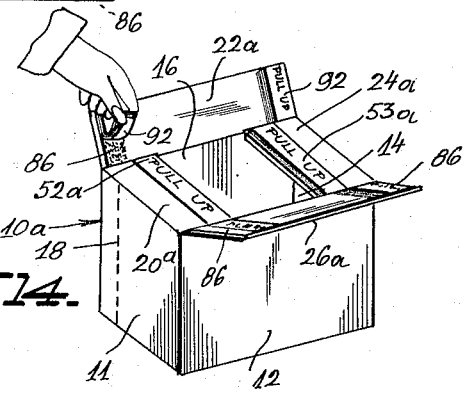
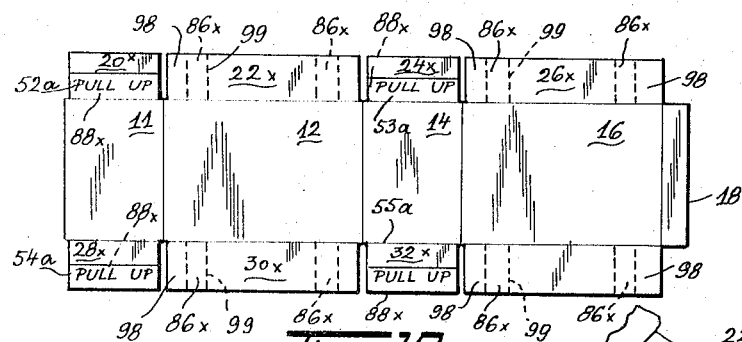
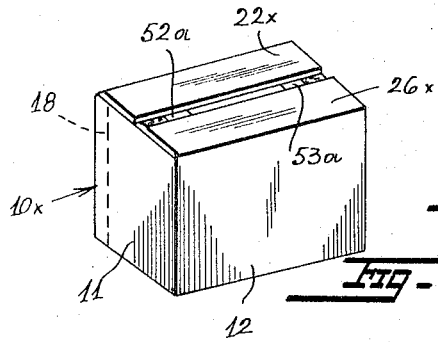
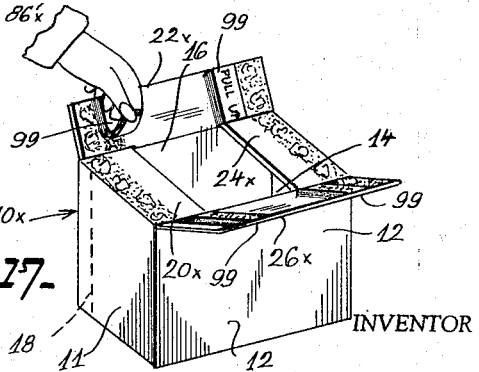

Feb. 28, 1967      A. GIACOVAS      3,306,521
SELF-SEALING PAPERBOARD CARTONS
Filed Oct. 28, 1965      5 Sheets-Sheet 4
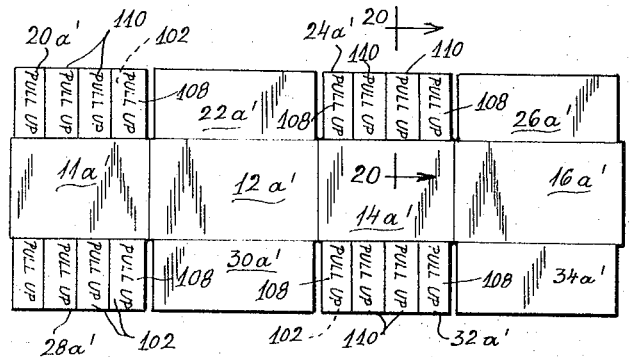
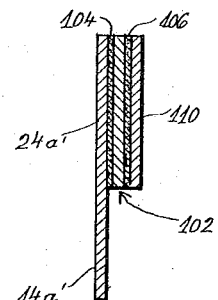
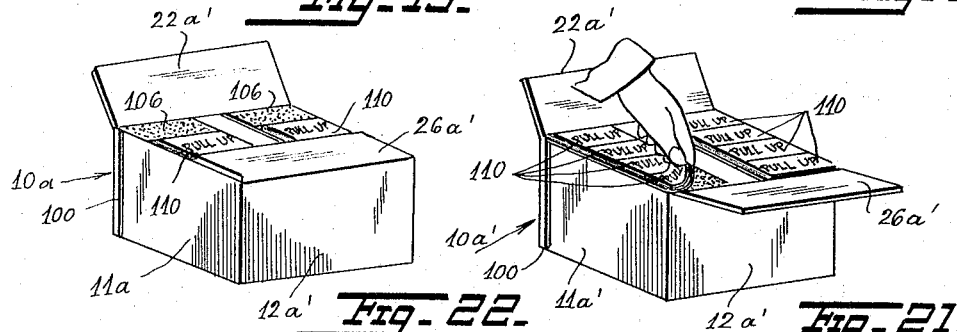
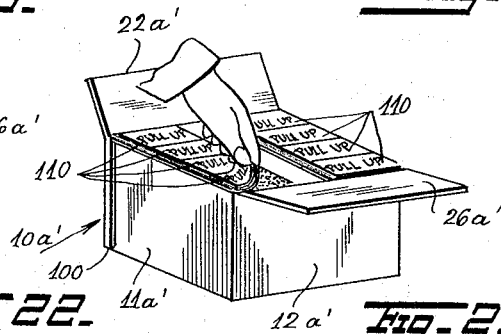
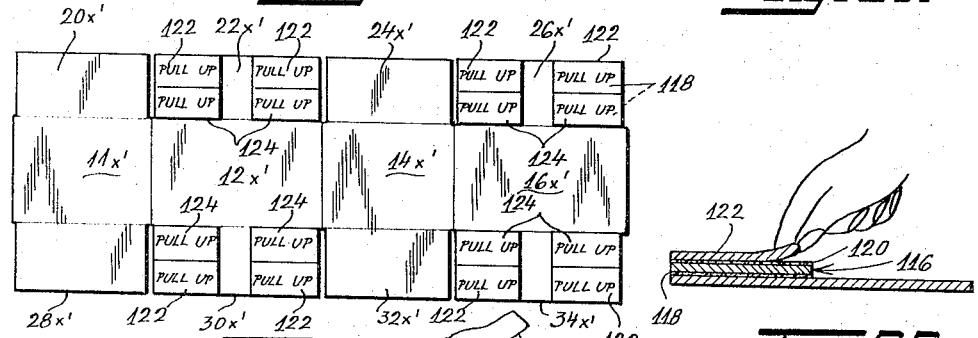
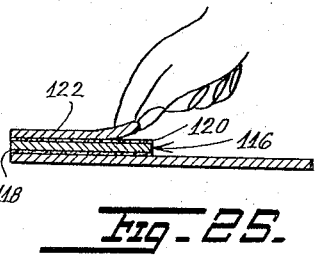
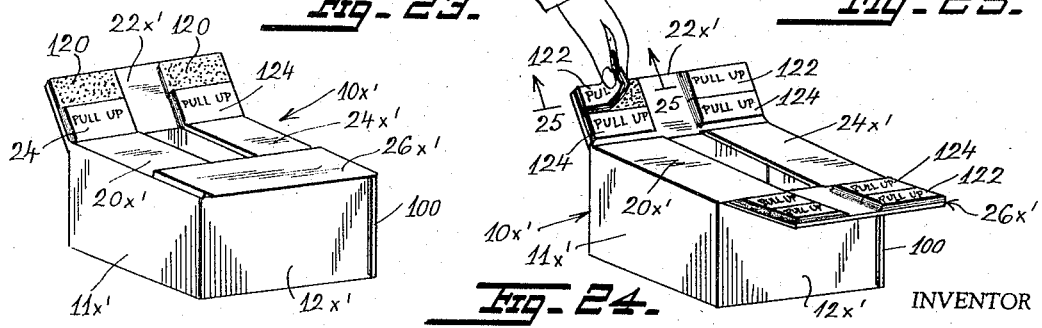
INVENTOR
Alfred Giacovas
BY Polachek & Saulsbury
ATTORNEYS

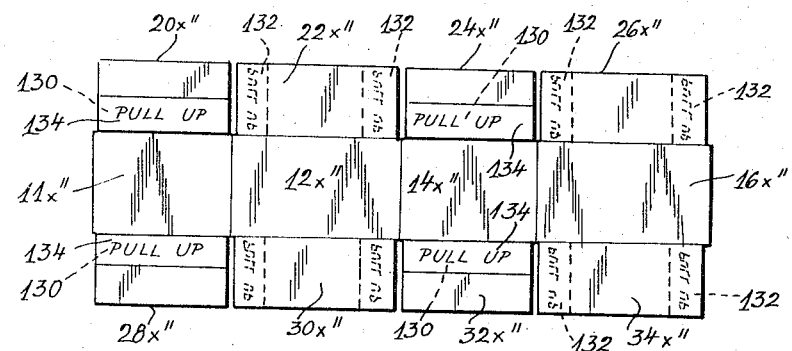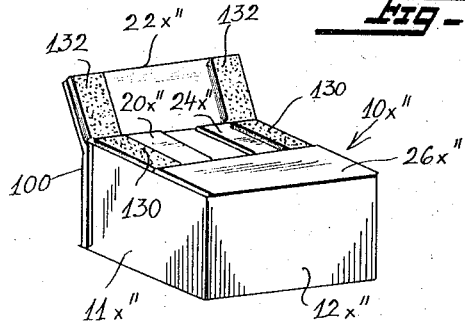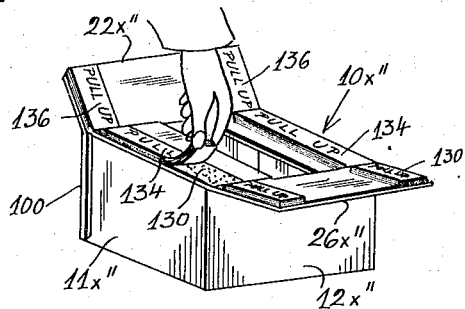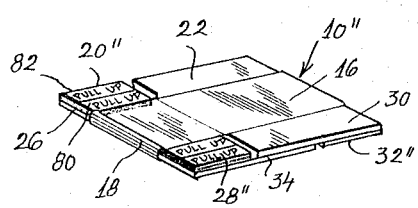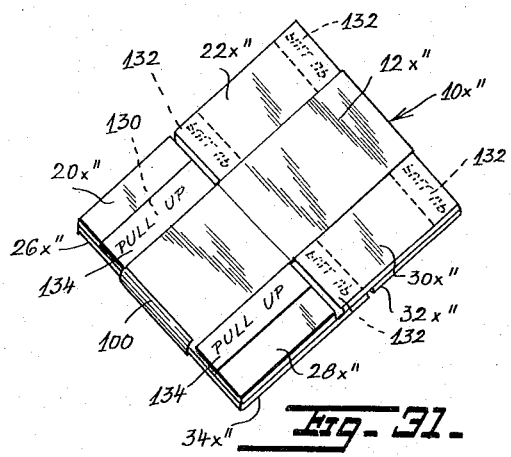

United States Patent Office 3,306,521
Patented Feb. 28, 1967

3,306,521
SELF-SEALING PAPERBOARD CARTONS
Alfred Giacovas, 530 E. 90th St., New York, N.Y. 10028
Filed Oct. 28, 1965, Ser. No. 505,509
2 Claims. (Cl. 229—45)

This invention relates to improvements in self-sealing paperboard cartons and to a method of coating the closure flaps with pressure-sensitive adhesive so as to prevent a stack of the collapsed cartons from sticking together and so as to ensure that the flaps adhere.

It has also been found in practice that the adhesive often becomes absorbed in the material of the flap so that it becomes ineffective.

Numerous attempts have been made to devise a self-sealing paperboard carton having overlapping flaps bearing pressure-sensitive adhesive which when collapsed, the flaps will not become stuck to each other or to other individual cartons of a similar type upon being stacked one upon the other for storage or shipment and before being used.

To this end, the manufacture of such cartons has required a drying of the tacky adhesive before the blanks could be assembled and the knocked-down structure stacked for storage and shipment. The blanks have to be kept separated from each other until the necessary drying has been obtained. Similarly, even after the adhesive has been dried so as to be non-tacky, care must be taken to see that the adhesive areas are not united when the carton walls and flaps are folded upon one another and the flat-folded cartons are so stacked that the adhesively coated flaps of one carton do not contact the adhesively coated flaps of the adjacent carton. Such special handling not only reduces the speed at which the carton can be fabricated but increases its cost. Furthermore, undue pressure must be brought to bear against the adhesive areas in order to seal the flaps, and to permit safe folding and stacking the adhesive areas have had to be located on the flaps where it is difficult upon erecting the carton to apply the pressure required to adequately seal the flaps.

Accordingly, it is the principal object of the present invention to provide a paperboard carton structure having self-sealing end closures which can be fabricated at high speeds and the flat folded cartons immediately stacked for storage and shipment without drying the adhesive coatings.

Another object of the invention is to provide a self-sealing paperboard carton structure in which the carton can be folded for shipment and the flat-folded structures may be stacked one upon the other without the adhesive areas of one carton joining with one another or the areas of the one carton coming into contact with any portion of another carton structure.

Still another object of the invention is to provide a pressure-sensitive self-sealing carton in which the adhesive area does not have to be restricted in area upon the flaps to permit folding and stacking of the adhesive applied cartons.

Still another object of the invention is to provide a self-sealing carton which has adhesive areas located on the closure flaps close to the hinge connection of the flaps with the walls so that upon erecting the carton only ordinary pressure need be applied to seal the flaps together and which will not necessitate the need for the foot within the carton to obtain the pressure.

Yet another object is to provide a self-sealing carton with a tape adapted to be glued to a closure flap, the tape carrying a coating of adhesive and a protective strip, the coating of adhesive adapted to preserve its strength until used.

A further object of the invention is to provide a self-sealing carton structure with detachable cover strips which serve to protect undried adhesive coatings at all times and positively prevent the coated area of the cartons from coming into contact with each other or with any portion of the next adjacent structure when the structures are stacked one upon the other and this being equally applicable for all size cartons.

A further object of the invention is to eliminate the need for mating adhesive areas, the pre-drying operation needed for mating adhesive areas and time lost before being able to fold and stack the collapsed cartons.

Still further objects of the invention are to provide a carton of this kind that is simple in construction, economical to manufacture, easily stacked, easily assembled and easily opened.

For further comprehension of the invention, and of objects and advantages thereof, reference should be had to the following description and accompanying drawings and to the appended claims in which the various novel features of the invention are more particularly set forth.

In the accompanying drawings forming a material part of this disclosure:

FIGURE 1 is a plan view of a pre-shaped open carton blank bearing the covered adhesive areas on the end flaps and adapted to form a carton embodying the teachings of the present invention.

FIG. 1A is an enlarged cross sectional view taken along line 1A—1A of FIG. 1 to show the adhesive provided upon the flaps by adhering paper strips to the flaps bearing the covered tacky substance.

FIG. 2 is a perspective view of a carton made from the blank shown in FIG. 1, with a sealing tape added, in partly open condition, illustrating one step in the sealing of the carton.

FIG. 3 is a similar view showing the carton in completely closed condition.

FIG. 4 is a plan view similar to FIG. 1 of a blank with the adhesive areas on the side flaps and adapted to form a carton according to a modified form of the invention.

FIG. 5 is a perspective view of a carton made from the blank of FIG. 4, in partly open condition, illustrating steps in the sealing of the carton.

FIG. 6 is a similar perspective view illustrating a further step in the sealing of this carton.

FIG. 7 is a plan view of pre-shaped open carton blank having covered alternative and resealing covered adhesive areas which is adapted to form a carton embodying still another modified form of the invention.

FIG. 8 is a perspective view of a carton made from the blank of FIG. 7, in partly closed condition, illustrating a step in the sealing of the carton after it has once been opened.

FIG. 9 is a perspective view of the carton completely resealed.

FIG. 10 is a plan view of a pre-shaped open carton blank which is adapted to form a resealable carton according to another modified form of the invention, the covered adhesive areas being upon the side flaps.

FIG. 11 is a perspective view of a carton made from the blank of FIG. 10, in partly closed condition, illustrating a step in initially sealing the carton.

FIG. 12 is a similar perspective view illustrating a further step in initially sealing of the carton.

FIG. 13 is a plan view of a pre-shaped open carton blank with the covered adhesive areas on both the side and end flaps and adapted to form a resealable carton according to another modified form of the invention.

FIG. 14 is a perspective view of a carton made from the blank of FIG. 13, in partly open condition, illustrating a step in initially sealing the carton.

FIG. 15 is a similar view showing the carton in completely sealed condition.

FIG. 16 is a plan view of a similar pre-shaped open carton blank with adhesive areas on both side and end flaps and adapted to form a carton which is according to still another modified form of the invention.

FIG. 17 is a perspective view of a carton made from the blank of FIG. 16, in partly open condition, illustrating a step in effecting the sealing of the carton.

FIG. 18 is a perspective view of this carton completely re-sealed.

FIG. 19 is a plan view of a pre-shaped open carton blank having multiple covered adhesive areas running longitudinally upon the end flaps which is adapted to form a carton according to still further modified form of the invention.

FIG. 20 is an enlarged cross-sectional view taken on the line 20—20 of FIG. 19 to show the adhesive provided upon the flaps by adhering paper strips to the flaps bearing the covered tacky adhesive.

FIG. 21 is a top perspective view of a carton made from the blank of FIG. 19, in partly open condition, illustrating a step in initially sealing the carton.

FIG. 22 is a similar perspective view illustrating a further step in initially sealing the carton.

FIG. 23 is a plan view of a pre-shaped open carton blank having multiple covered adhesive areas running longitudinally along the side flaps and adapted to form a carton according to a still further modified form of the invention.

FIG. 24 is a top perspective view of a carton made from the blank of FIG. 23, in partly open condition, illustrating a step in initially sealing of the carton.

FIG. 25 is an enlarged cross-sectional view taken on the line 25—25 of FIG. 24, showing the tacky adhesive provided by a paper strip permanently adhered to the flap and illustrating the uncovering of the tacky adhesive preparatory to use.

FIG. 26 is a similar view to FIG. 24 showing a further step in initially sealing the carton.

FIG. 27 is a plan view of a pre-shaped open carton blank with covered adhesive areas located upon both side and end flaps and positioned to mate with one another to effect double strength sealing of the flaps adapted to form a carton according to a still further modified form of the invention.

FIG. 28 is a top perspective view of a carton made from the blank of FIG. 27, in partly open condition, showing one step in double sealing of the carton.

FIG. 29 is a similar view showing a further step in sealing the carton.

FIG. 30 is a top perspective view of the carton shown in FIG. 7 in collapsed condition ready for storage and shipment, the carton being of a size in which the width of the side walls is twice the width of the end wall and of equal division, and FIG. 31 is a similar view of the carton shown in FIG. 27 in collapsed condition ready for storage and shipment, the carton being of a size with the widths of the walls being of unequal division of one another.

Referring now particularly to FIGS. 1, 1A, 2 and 3 of the drawings, a carton blank is shown for making a rectangular carton 10. It will be understood that the blank will be formed from suitable fiberboard or paperboard cut and scored to provide body end and side walls 11, 12, 14, 16 and a side glue flap 18 articulated to the free side edge of the body side wall 16 and adapted to be connected to the end wall 11.

In the embodiment illustrated, the carton body is open top and bottom and is provided with top end and side closure flaps 20, 22, 24, 26 and similarly, the bottom closure is composed of flaps 28, 30, 32, 34. Preferably the end closure flaps 20, 24 and 28, 32 are articulated to the narrow body walls 11 and 14.

The side closure flaps 22, 26 and 30, 34 are articulated to the large side walls 12 and 16 and are full length closure flaps having a length equal to the length of the opposed walls 12 and 16. The remaining end flaps 20, 24, 28, 32 are of reduced longitudinal length. All of the flaps are of the same length so that all of the outer edges of the flaps are flush along the blank shown in FIG. 1.

In fabricating flat-folded carton structures from the blank of FIG. 1 just described, the body walls 11, 12, 14, 16 are infolded along their lines of articulation to the angular positions shown in FIG. 2, whereby the walls 12 and 16 constitute the side walls and the walls 11 and 14 the end walls of the carton. The free edge of the side wall 16 is secured to the free edge of the end wall 11 by the glue flap 18. Prior to the infolding of the walls, ordinary glue 40 will have been applied to the glue flap 18. A longitudinal seam is thus effected upon the end wall 11 and the blank is brought to a flat-folded tubular condition.

In accordance with the invention, each of the flaps 20, 24, 28, 32 is provided on its outer surface when folded inwardly to closure position, with a strip of paper constituting a tape 42 having a coating of water glue 49 over the one surface thereof and a coating of tacky adhesive 50 over the entire opposite surface thereof. The tapes are applied along the base portions of the end flaps 20, 24, 28, 32, adjacent to their hinge and articulated connections with the end walls 11 and 14. The water glue surface 49 of the tape is placed in contact with the base portion of the end flap in order to fasten the tape to the flap. The surface of the tape with the tacky adhesive 50 is thus exposed and keeps its strength as it cannot be absorbed by either the paper material of the tape or the material of the flap, the water glue surface 49 preventing such absorption.

In order to protect the tacky adhesive 50 on the tapes and prevent it from adhering to anything before the carton is sealed, the coating of tacky adhesive 50 on each flap is covered by a suitable releasable paper cover strip which extends entirely over and along the tacky adhesive 50. Thus since the tacky adhesive areas of the flaps are protected by elongated rectangular cover paper strips indicated at 52, 53, 54, 55. The cover strips may be made from any suitable material used to protect tacky adhesive.

After sealing the bottom of the carton, the carton is rested thereupon as shown in FIG. 2. In sealing the top and closure of the carton, the flaps 20 and 24 of the end walls 11 and 14, respectively, are folded downwardly as viewed in FIG. 2. With the flaps 20 and 24 in downwardly folded position, the protective strips 52 and 53 are preferably manually pulled off of the outer adhesive strips 42 and 44 now become effectively exposed to hold the top side flaps 22 and 26 in position. The top side flaps 22 and 26 are then folded downwardly as viewed in FIG. 3 and sealing pressure is applied in the conventional manner to complete the seal. While FIG. 2 shows the top end of the carton, the bottom end will have been closed and sealed in the same fashion.

Because the adhesive tapes can lie over the base portions of the end flaps adjacent the hinge connections with the end walls, rather than outwardly thereof, easy sealing without need for using the foot within the carton can be effected. Since the adhesive areas are protected, the cartons can be collapsed as shown in FIG. 30 and stacked for shipment and storage without waiting for adhesives to dry or being concerned with pre-sticking by portions of the cartons with one another or the stacked cartons together.

The modified form of carton 10' shown in FIGS. 4 to 6, inclusive, differs from the carton 10 merely in the position of the adhesive tapes on the flaps. In carton 10', the adhesive tapes are placed on side flaps 22', 26', 30' and 34' instead of on end flaps 20', 24', 28', 32' as in carton 10. Adhesive tapes are positioned on the ends of the side flaps as indicated at 60, 62 on top side flap 22', at 64, 66 on top side flap 26', at 68, 70 on bottom side flap 30' and at 72, 74 on bottom flap 34'. Protective strips 78 are placed over each of the adhesive tapes.

In assembling the carton 10', walls 11', 12', 14' and 16' are erected by joining glue flap 18' of side wall 16' to end wall 11', the bottom end flaps 28' and 32' are folded inwardly. The protective strips 78 are peeled off of the adhesive tapes 68, 70, 72, 74 on the bottom side flaps 30' and 34' and these side flaps then turned inwardly over the end flaps 28' and 32' and manual pressure exerted on the inner surfaces of the end flaps 28' and 32' to cause the flaps to adhere together. The same steps are taken to close and seal the top end of the carton 10', that is, the top end flaps 20' and 24' are turned inwardly and then the protective strips 78 are peeled off of the top side flaps 22' and 26' and after the carton will have been filled with its contents, the side flaps are then turned inwardly over the end flaps 22' and 24' and manual pressure is brought to bear against the side flaps to make the flaps adhere to each other and seal the top closure. Because of the adhesive being fresh and located close to end walls the pressure when applied is effective to provide quick and easy sealing of the carton. The carton 10' when collapsed and preparatory to use, because of the end and side walls being proportioned in width, one to two will appear generally as shown in FIG. 30, with no tacky adhesive tapes exposed to adhere with one another or when stacked.

In FIGS. 7 to 9, inclusive, another modified form of carton 10" is illustrated. This carton 10" differs from carton 10 of FIGS. 1 to 3, inclusive, merely in that the entire surface area of each of the end flaps 20", 24", 28", 32" is covered with adhesive tapes as indicated at 79. Furthermore, on each such adhesive tape there is placed an inner protective strip 80 and an outer protective strip 82. In all other respects, the carton 10" is similar to carton 10 and similar reference numerals are used to indicate similar parts. This carton 10", by using but one set of adhesive tapes at one time and using the other set of adhesive tapes at another time, provides means by which the carton can be resealed.

In sealing the carton 10", the protective strips 80 along the base end of the bottom end flaps 28" and 32" are peeled off the adhesive tapes 79 leaving the protective strips 82 on the outer end in place on the adhesive. The bottom side flaps 30, 34 are then turned inwardly over the end flaps and manual pressure brought to bear to make the flaps adhere, along the exposed adhesive tapes.

The top closure is similarly sealed by peeling off the protective strips 80 from the base end of the top end flaps 20", 24" and the top side flaps 22, 26 turned inwardly over the end flaps. External pressure is brought to bear against the side flaps 22, 26 to make the flaps adhere. All of this has been done in the manner as described with reference to FIGS. 1 to 3.

In this form of the invention, after the carton 10" has been opened, it may be resealed by merely peeling off the protective strips 82 along the outer ends of the end flaps 20", 24" to expose the adhesive 79 as shown in FIG. 8 whereupon by merely folding the side flaps 22, 26 inwardly over the fresh adhesive the overlapping flaps will be sealed. This carton 10" is collapsed for storage as shown in FIG. 30.

FIGS. 10 to 12 inclusive illustrate a further modified form of carton 10'''. The carton 10''' differs from the carton 10' of FIGS. 4 to 6, inclusive, in that instead of a single protective strip 78 being used to cover single adhesive tapes on the ends of the side flaps 22''', 26''', 30''', 34''' where as with this type two such strips 78" cover each of the larger tapes 60, 62, 64, 66, 68, 70, 72 in side by side relation. By reason of this provision of a pair of protective strips on each adhesive tape, one of the strips, for example, the outermost strip 78" may be first peeled off for initially sealing the outermost ends of the side flaps to the end flaps, and after the carton is opened, the carton may be resealed by peeling off the innermost strips to present fresh adhesive for resealing the carton.

The modified form of carton 10a in FIGS. 13 to 15, inclusive, differs from the carton 10 of FIGS. 1 to 3, inclusive, in that the ends of the top and bottom side flaps 22a, 26a, 30a, 34a, are provided with adhesive tapes on the underside of the blank as indicated at 86, and the outer free ends of the top and bottom end flaps 20a, 24a, 28a, 32a are provided with adhesive tapes as indicated at 88, 90 instead of at the base end of the end flap. Protective strips 52a, 53a, 54a, 55a cover the adhesive tapes on the outer ends of the end flaps 20a, 24a, 28a, 32a, respectively, and protective strips 92, 92 cover the adhesive tapes on the top side flaps 22a, 26a and protective flaps 94, 94 cover the adhesive tapes on bottom side flaps 30a, 34a.

In all other respects, the carton 10a is similar to carton 10 and similar reference numerals are used to indicate similar parts.

In sealing the carton 10a, the end flaps 28a and 32a are turned inwardly. The protective strips 94, 94 on the bottom side flaps 30a, 34a are then peeled off of the adhesive tapes 86. The bottom side flaps are then turned inwardly over the end flaps 28a, 32a and the flaps manually pressed against each other to make the flaps adhere along the adhesive tapes.

The top flaps are similarly sealed by turning in the end flaps 20a, 24a and peeling off the protective strips 92 on the top side flaps 22a, 26a to expose the tacky adhesive tapes 86. These top side flaps turned inwardly over the end flaps whereupon manual pressure is exerted upon the overlapping flaps to make the flaps adhere to each other along the adhesive tapes.

After carton 10a has once been opened, the carton may be resealed by peeling off the protective strips 52a, 53a from the end flaps 20a, 24a, respectively, folding the top side flaps 22a, 26a inwardly over the end flaps and manually pressing the overlapped flaps together. If the carton be collapsed before it is resealed then the bottom protective strips 54a, 55a have to be pulled to expose the adhesive tapes 90 on the bottom end flaps.

The carton 10x is sealed similarly to carton 10a by folding inwardly the end flaps and then folding inwardly the side flaps over the end flaps. In carton 10x, however, the extreme side ends of the side flaps are initially glued to the base portions of the end flaps and may be adhered to the free outer ends of the end flaps if it is desired to reseal the carton after opening. In order to reseal the carton, the protective strips 99 are peeled from the side flaps as illustrated in FIG. 17 and the side flaps folded over the end flaps in overlapping relation and manually pressed thereagainst.

The bottom side flaps 30a, 34a are then turned inwardly over the bottom end flaps 28a, 32a and manual pressure brought to bear to make the flaps adhere to each other, along the adhesive tapes 90.

FIGS. 16 to 18, inclusive, illustrate a modified form of carton 10x which is somewhat similar to the carton 10a of FIGS. 13 to 15, inclusive, differing only in that the adhesive tapes 86x on the top side flaps 22x, 26x and on the bottom side flaps 30x and 34x are not on the extreme side of the flaps but spaced inwardly of the ends leaving a space 98 free of adhesive thereat. Adhesive tapes 88x on the end flaps 20x, 24x, 28x, 32x are along the bases of the end flaps instead of being along the outer free ends as in FIG. 13. In all other respects carton 10x is similar to carton 10a with similar reference numerals used to indicate similar parts.

In FIGS. 19 to 22, inclusive, another modified form of carton 10a' is shown. The carton 10a' is somewhat similar to the form of carton 10" of FIG. 9 but in place of a glued attaching flap 18, the panels are held in erected tubular form by a glued tape 100.

Furthermore, the carton 10" of FIG. 9 is rectangular in shape because of its side panels 12 and 16 are twice the width of the end panels 11 and 14.

Carton 10a', however, while rectangular in shape is nearly square because its side panels 12a' and 16a' are only slightly wider than the width of the end panels 11a' and 14a'. In this form of the invention, the entire surface of the end flaps 20a', 24a', 28a', 32a' are provided with adhesive. For this purpose, a series of specially prepared tapes 102 with an inner glued surface 104 are glued thereby to the top surface of the end flaps as shown in FIG. 19. The outer surfaces of the tapes are coated with pressure-sensitive or tacky adhesive 106 over the entire area thereof. In accordance with this form of the invention, narrow strips of protective paper 110 are placed over the adhesive 106 transversely of the flaps.

In sealing the carton 10a', a pair of outer opposed strips may be peeled off, as shown in FIG. 22 and the side flaps 22a', 26a', 30a', 34a' are then folded inwardly over the end flaps and pressed.

If it is desired to use the carton 10a' after initial opening, the carton may be resealed by peeling off the intermediate strips 110 leaving fresh adhesive to contact the side panels for securing same to the end panels.

This carton 10a' may be folded for shipment without fear of adhesive areas contacting each other and adhering to each other since all adhesive areas are covered until the box is to be used.

FIGS. 23 to 26, inclusive, illustrate another modified form of carton 10x' similar in construction, rectangular in shape and dimensions to the carton 10a' of FIG. 21 and differing only in the position and arrangement of the adhesive areas. In carton 10x', the side flaps 22x', 26x', 30x', 34x' on side walls 12x', 16x' are provided with the coated adhesive tapes 122 instead of the end flaps as in carton 10a'. In carton 10x', only the ends of the side flaps are coated with adhesive. For this purpose, tapes 116 with an inner glued surface 118 is glued to the top surface of the side flaps as shown in FIG. 26. The outer surfaces of the tapes are coated with pressure-sensitive adhesive 120. In accordance with this form of the invention, narrow strips 122 and 124 of protective paper cover the adhesive 120 longitudinally of the side flaps. These strips 122 run along the outer free ends of the side flaps while the strips 124 run along the base of the side flaps.

In sealing the carton 10x', a pair of opposed outer strips 122 may be peeled off, as shown in FIG. 26, and the side flaps are then folded inwardly over end flaps 20x', 24x', 28x', 32x' and manual pressure brought to bear against the flaps to seal the carton.

The carton 10x' may be reused and resealed by peeling off the base strips 124 of the side flaps and again folding the side flaps inwardly bringing pressure to bear against the flaps for sealing the carton.

The modified form of carton 10x" shown in FIGS. 27 to 29, inclusive, differs from the carton 10x' shown in FIGS. 23 to 26, inclusive, merely in the positioning of the adhesive coated areas. In carton 10x", the coated areas are positioned along the base portions of the end flaps 20x", 24x", 28x", 32x" longitudinally thereof, as indicated at 130, and across the ends of the side flaps 22x", 26x", 30x", 34x" as indicated at 132. The areas may be coated with adhesive either directly as shown or by means of glued tapes with pressure-sensitive adhesive on their outer surface thereof similarly to carton 10x'.

The pressure-sensitive adhesive is protected by protective strips 134 and 136 on the end flaps and side flaps, respectively.

In sealing the carton, the protective strips are peeled off and the flaps manually pressed against each other as with the other forms of the invention but with this form because of the adhesives being placed on the end and side flaps to come into engagement with one another and pulling both the corresponding cover strips of the adjacent end and side flaps a double strength sealing effect of fresh adhesive can be had.

In FIG. 31, this carton 10x" is shown collapsed for shipment.

In FIG. 30, there is illustrated a folded carton ready for shipment, such as the carton 10" of FIG. 9 wherein it will be seen that the panels and flaps are folded into a very compact structure with the panels and flaps in overlapping relation and the coated areas thereon protected by the cover strips so that there is no fear of such panels and flaps adhering to each other.

It should now be apparent that a self-sealing carton has been provided with all forms shown wherein the sealing is effected at the base portions of the end flaps so the adequate manual pressure can be made upon the flaps to initially seal them. With dried and uncovered tacky adhesives adapted to mate with one another, this location of the adhesives on the base portions of the end flaps are not always permitted with all shapes of cartons since the folding of the cartons would allow for the mating of the adhesives. Further, by covering the adhesives, time is not lost in the manufacture to dry the adhesives.

While I have illustrated and described the preferred embodiments of my invention, it is to be understood that I do not limit myself to the precise constructions herein disclosed and that various changes and modifications may be made within the scope of the invention as defined in the appended claims.

What is claimed is:

1. A fiberboard carton having a rectangular body with side and end was hingedly connected together and being open top and bottom, closure side and end flaps extending from and hingedly connected to the top edges of said side and end walls, tacky adhesive closure securing means applied to opposing closure flaps, said securing means including tapes having tacky adhesive areas and secured upon one surface of certain of the closure flaps, said adhesive areas on the tapes being adapted to be adhesively united with other opposing closure flaps, pull cover strips extending over the tacky adhesive areas of the tapes, said tacky adhesive closure securing tapes being applied to the opposed end wall closure flaps, the tape adhesive areas being constituted by pressure sensitive adhesive coated on the outer surface of the tapes, and means for securing the tapes to the end wall flaps, the pull cover strips extending across the tapes over the pressure sensitive adhesive on the tapes in side-by-side relation and running lengthwise of the end wall flap over the base and free end portions thereof.

2. A fiberboard carton having a rectangular body with side and end walls hingedly connected together and being open top and bottom, closure side and end flaps extending from and hingedly connected to the top edges of said side and end walls, tacky adhesive closure securing means applied to opposing closure flaps, said securing means including tapes having tacky adhesive areas and secured upon one surface of certain of the closure flaps, said adhesive areas on the tapes being adapted to be adhesively united with other opposing closure flaps, pull cover strips extended over the tacky adhesive areas of the tapes, the tacky adhesive closure securing means being applied to the opposed side wall flaps, said latter means comprising tapes placed over each end of each side wall flap, and means for securing the tapes to the side wall flaps, said tapes having pressure-sensitive adhesive coated on the outer surface thereof, the pull cover strips being constituted by a pair of strips on the pressure sensitive adhesive coatings runnings transversely of the side flaps in side-by-side relation.

References Cited by the Examiner

UNITED STATES PATENTS

| | | | |
|---|---|---|---|
| 2,063,999 | 12/1936 | Harrison | 229—45 |
| 2,109,583 | 3/1938 | Bennett | 154—43 |
| 2,476,325 | 7/1949 | Rowe | 93—35 |
| 2,998,180 | 8/1961 | Dehoney | 229—43 |
| 3,116,008 | 12/1963 | Greene et al. | 229—48 |
| 3,149,771 | 9/1964 | Pearl | 229—55 |
| 3,184,144 | 5/1965 | Greene et al. | 229—37 |

FOREIGN PATENTS 636,216  2/1962  Canada.

GEORGE O. RALSTON, *Primary Examiner.*